United States Patent [19]
Duvinage et al.

[11] Patent Number: 5,638,780
[45] Date of Patent: Jun. 17, 1997

[54] INLET SYSTEM FOR A TWO CYCLE INTERNAL COMBUSTION ENGINE

[75] Inventors: Frank Duvinage, Kirchheim; Günter Karl, Esslingen; Leopold Mikulic, Aichwald; Michael Krämer, Notzingen; Jörg Abthoff, Plüderhausen, all of Germany

[73] Assignee: Daimler-Benz AG, Stuttgart, Germany

[21] Appl. No.: 609,245

[22] Filed: Mar. 1, 1996

[30] Foreign Application Priority Data

Mar. 2, 1995 [DE] Germany ................ 195 07 220.0

[51] Int. Cl.⁶ .................................................. F02B 25/08
[52] U.S. Cl. .................................. 123/65 VA; 123/65 W
[58] Field of Search .................. 123/65 W, 65 VA, 123/65 P, 65 PD, 430

[56] References Cited

U.S. PATENT DOCUMENTS

| | | | |
|---|---|---|---|
| 2,038,271 | 4/1936 | Curtis | 123/65 W |
| 2,236,742 | 4/1941 | Allyn | 123/65 VA |
| 2,409,761 | 10/1946 | Hulsing | 123/65 VA |
| 2,523,599 | 9/1950 | Sparmann | 123/65 VA |
| 3,000,366 | 9/1961 | Blackburn | 123/65 VA |

FOREIGN PATENT DOCUMENTS

| | | |
|---|---|---|
| 0 204 687 | 12/1986 | European Pat. Off. . |
| 695 502 | 8/1940 | Germany . |
| 1 015 267 | 9/1957 | Germany . |
| 29 09 591 | 1/1980 | Germany . |
| 28 54 346 | 2/1980 | Germany . |
| 29 32 627 | 2/1981 | Germany . |
| 35 10 770 | 10/1986 | Germany . |
| 41 33 138 | 2/1992 | Germany . |
| 61-258924 | 11/1985 | Japan . |
| 5-280344 | 10/1993 | Japan . |

*Primary Examiner*—Marguerite McMahon
*Attorney, Agent, or Firm*—Klaus J. Bach

[57] ABSTRACT

In an inlet system for a two-cycle internal combustion engine which includes a cylinder with a piston reciprocating therein between a top dead center position and a bottom dead center position and in which at least two rows of scavenging air flow passages are arranged in separate flow planes around the cylinder adjacent the bottom dead center position of the piston which are closed by the piston when it is remote from the bottom dead center position, each of the separate flow planes includes independent air flow control components for independently controlling the admission of scavenging air to the scavenging air passages in the different flow planes.

9 Claims, 5 Drawing Sheets

INLET SYSTEM FOR A TWO CYCLE INTERNAL COMBUSTION ENGINE

BACKGROUND OF THE INVENTION

The invention relates to an inlet system for a two-cycle internal combustion engine with at least one cylinder around which scavenging air passages are arranged in at least two inlet rows disposed in at least two separate air admission planes, wherein the admission of the scavenging air is controlled by the piston reciprocating in the cylinder.

DE 28 54 346 C2 discloses such an air inlet system for a two-cycle engine with uniflow scavenging. The engine comprises an operating cylinder with a cylinder working surface which includes scavenging slots distributed circumferentially around the cylinder in two inlet rows disposed adjacent one another. Opening of the scavenging air slots in the cylinder operating surface and admission of scavenging air to the cylinder is controlled by a piston reciprocating in the cylinder. The engine includes an auxiliary blower separate from the operating cylinder-piston set by which fresh air can be admitted to the cylinder via two rows of inlet scavenging slots.

The similar EP 02 04 687 A2 discloses a two-cycle engine with a cylinder having a cylinder wall in which circumferentially distributed converging slots are arranged. The engine further includes a control arrangement which influences the spin of the fresh charge air entering the cylinder through the inlet slots. The fresh air charge stream is divided into two partial streams such that the fresh air charge in the charging space surrounding the cylinder obtains, via the control arrangement, a controllable pre-spin depending, preferably, on engine speed and engine load.

For further, general, background information reference is made to the publications DE-PS 10 15 267, DE 29 09 591 C2, DE 35 10 770 C2 and DE 41 33 138 A1.

It is the object of the present invention to provide an inlet system for a two-cycle engine in such a way that, when the scavenging slots are open, spin and volumetric flow of the fresh air admitted to the cylinder can be controlled such that fuel consumption and emissions of the engine are reduced.

SUMMARY OF THE INVENTION

In an inlet system for a two-cycle internal combustion engine which includes a cylinder with a piston reciprocating therein between a top dead center position and a bottom dead center position and in which at least two rows of scavenging air flow passages are arranged in separate flow planes around the cylinder adjacent the bottom dead center position of the piston which are closed by the piston when it is remote from the bottom dead center position, each of the separate flow planes includes independent air flow control components for independently controlling the admission of scavenging air to the scavenging air passages in the different flow planes.

It is an advantage of the inlet system according to the invention that, with the admission control of the fresh air by inlet openings which are opened by the piston (for example, inlet slots, bores or elongated openings), a multitude of variation possibilities is provided depending only on the engine operating point. It is, for example, possible to control the spin dependent on changes in the flow volume or, with constant flow volume, in such a way that the engine operating capability during suction operation is improved and the scavenging requirements are reduced. By appropriate control of the spin and of the flow volume of the fresh air admitted to the cylinder the fuel consumption and the engine emissions can be substantially reduced.

If, in accordance with one embodiment of the invention the scavenging openings have different inlet geometries such that the scavenging air enters the cylinder radially through some and tangentially through others of the openings, exhaust gas can be retained variably without disadvantages in the spin and the axial velocity distribution as boundary condition and the flow pattern within the interior of the cylinder during the compression and mixture forming stage can be controlled. In this connection, it is particularly advantageous if the passages of the lower one of the two rows of inlets enter radially and the passages of the upper row of inlets enter the cylinder tangentially since the opening period for the upper row of inlets is longer than that for the lower row of inlets. This provides for a greater basic spin for the fresh air entering the cylinder through the upper row of inlets.

If at least one of the two air admission levels includes two rows of inlet openings the flexibility in controlling the fresh admission is further increased. It is, for example, possible that the scavenging inlets of two rows enter the cylinder at different angles so that, with each inlet row a different spin can be provided for the fresh intake air.

An arrangement wherein the scavenging air passages are tangential bores in the upper row of inlets and the bores in the lower row of inlets are somewhat off radial (slightly tangential) is a preferred design.

If means are arranged in the scavenging passages by which the spin of the air can be controlled and also the flow cross-section of the various scavenging air passages can be controlled, the adjustment possibilities for the spin and the flow volume of the fresh air are particularly versatile. The flow volume and the spin of the fresh air admitted is, for example, controllable dependent on the engine operating point. By appropriate adjustment of the spin and the flow volume of the fresh air admitted to the cylinder the fuel consumption and the emissions can be further reduced.

If pivotable guide vanes are used whose positions can be infinitely controlled, the control of the fresh air flow is highly flexible. Such an arrangement permits even to block the air flow cross-section of the scavenging air passages by means of the guide vanes independently of the position of the piston.

An arrangement wherein the flow cross-section of the scavenging air passages are controlled by a movable ring which surrounds the cylinder and has circumferentially spaced openings is particularly simple and inexpensive to manufacture. In such an arrangement the air flow cross-section can be controlled to a large degree independently of the position of the piston.

In the lower row of inlets open cross-section of the scavenging air passages may extend downwardly below the upper edge of the piston when it is in its bottom dead center position whereby the thermally highly-stressed upper edge of the piston can be cooled in a simple manner.

Further embodiments and advantages of the invention will become apparent from the following description. The invention is described in greater detail on the basis of three embodiments shown in the drawings.

DESCRIPTION OF PREFERRED EMBODIMENTS

Figure 1:
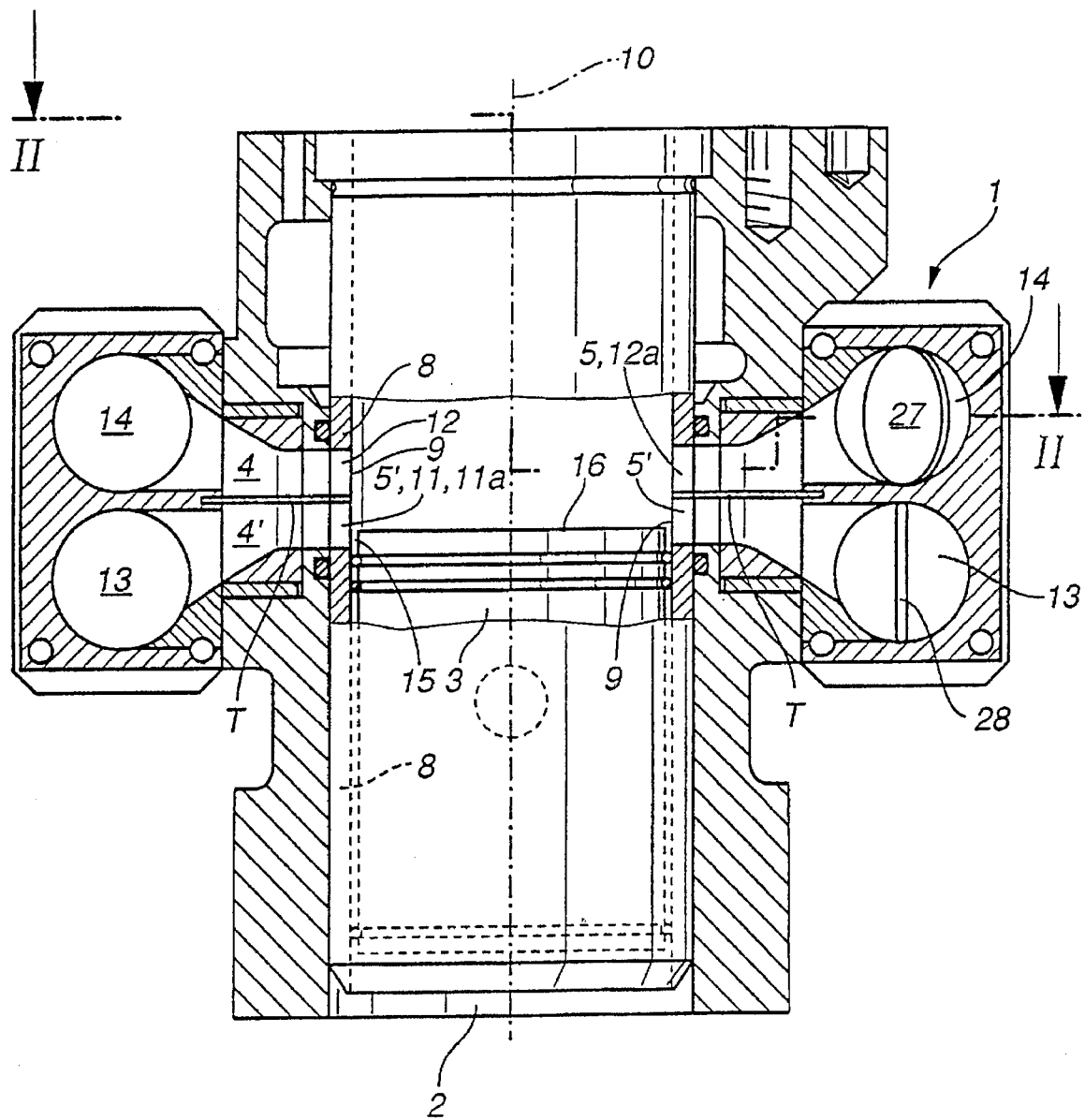
FIG. 1 is a schematic cross-sectional representation of an inlet system of a two-cycle internal combustion engine which is not shown in detail wherein the cross-section is taken in the axial plane of the cylinder and the inlet system has two separate scavenging air flow planes each leading into the cylinder by way of a separate row of inlets with scavenging air openings.
Figure 3:
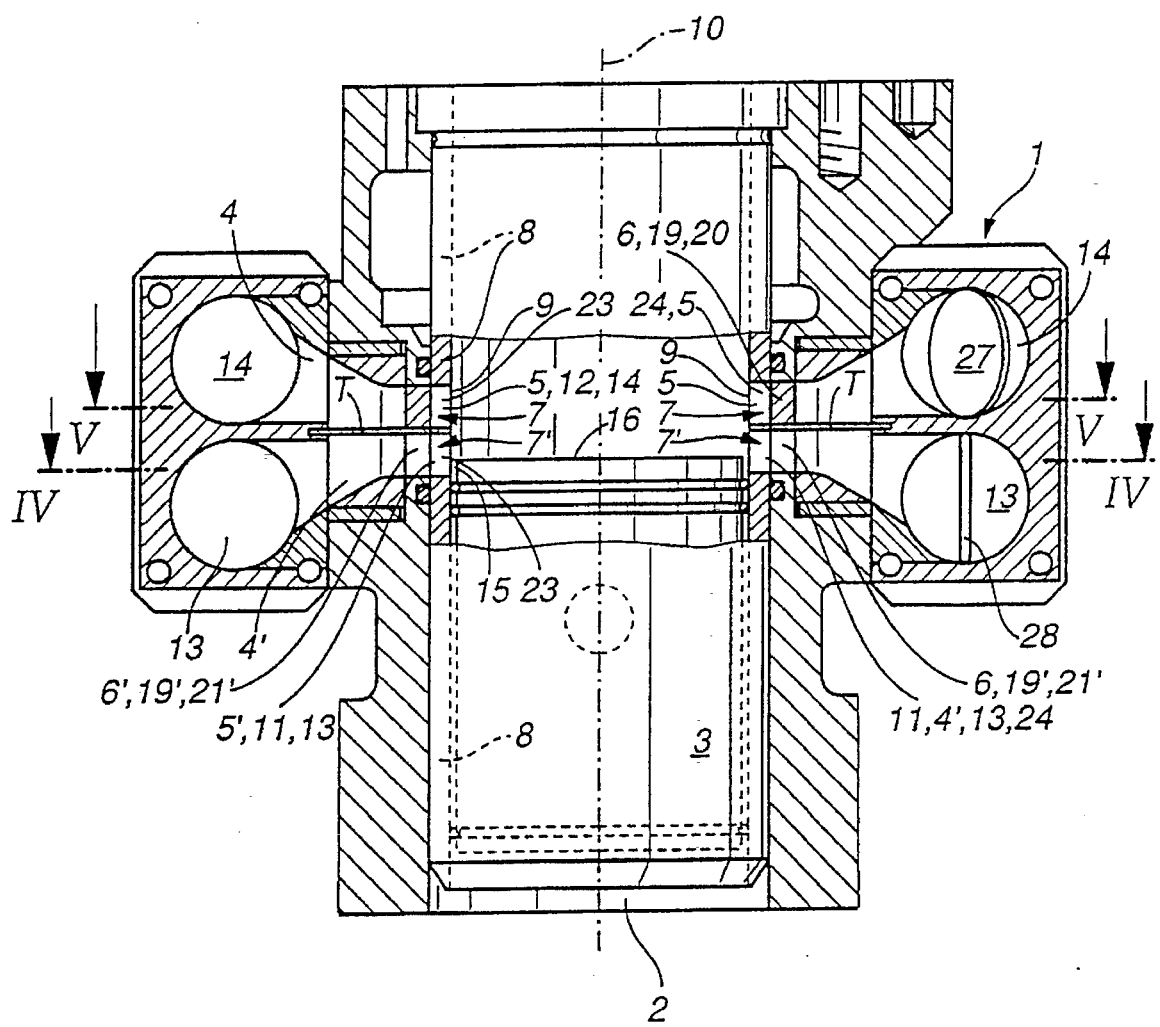
FIG. 3 is a schematic cross-sectional representation of an inlet system similar to that of FIG. 1, wherein, in the area of the scavenging air openings in the cylinder, means are provided for influencing the spin of the fresh air admitted and for controlling the flow volume of the air.

FIGS. 1 and 3 are schematic cross-sectional views of two embodiments of the invention showing an inlet system 1 of a two-cycle internal combustion engine which itself is not shown in detail. It includes a cylinder 2, a piston 3 and scavenging air channels 4, 4' with scavenging air passages 5, 5'. The cross-sectional plane extends through the axial centerline 10 of the cylinder 2.

The cylinder 2 has a cylinder working surface 8 and admission of scavenging air to the cylinder 2 is controlled by the piston 3 reciprocating along the cylinder working surface 8 with the openings 9 of the scavenging air passages 5, 5'.

When viewed in the direction of the cylinder axis 10 the scavenging air passages 5, 5' are arranged in two rows 11, 12 of inlets which are disposed on top of one another. The row 11 of inlets is disposed in a flow plane 13 and the row 12 of inlets is disposed in a flow plane 14. The scavenging passages 5 are assigned to the row 12 of the inlets and the scavenging passages 5' are assigned to the row 11 of inlets.

The two flow planes 13, 14 are disposed adjacent one another and are separated by a dividing plane T (see FIGS. 1, 3 and 8) so as to provide for distinct air supply flows. Each of the flow planes 13, 14 has its own control components 25, 26 and 27, 28 respectively (for example, butterfly valves, see FIG. 2). The dividing plane T may be formed, for example, by a metal plate or a plastic plate (see FIGS. 1 and 3) which is connected to a wall extending between the two flow planes 13, 14 and which extends into an annular gap in the cylinder crankcase up to a cylinder sleeve (cylinder 2) so that two scavenging air channels 4, 4' are formed. The metal or plastic plate may be connected to a web which separates the two rows 11 and 12 of inlets in the cylinder sleeve in the direction of the cylinder axis so that the dividing plane T is formed by said metal or plastic plate and by the web.

Fresh air for the cylinder 2 is supplied to the row 11 of inlets by way of the flow plane 13, to the row 12 of inlets by way of the flow plane 13 and to the row 12 of inlets by way of the flow plane 14. In FIG. 1 the throttles 27 and 28 are shown in different opening positions; the throttle 27 is shown partially open and the throttle 28 is shown fully open. The throttles 25–28 are adjusted in principle in the known manner by way of an electric or a mechanical controller.

As shown in FIG. 1 the flow planes 13, 14 which are fluid dynamically separated from one another lead directly to the rows 11, 12 of inlets. The scavenging air passages 5, 5' of each row 11, 12 of inlets are formed by bores 11a, 12a which are evenly distributed over the circumference of the cylinder 2 (see FIG. 8).

The scavenging air passages 5, 5' of the rows 11, 12 of inlets have different inlet geometries such that, in the row 11 of inlets, the air flows radially into the cylinder 2 and, in the row 12 of inlets, the air flows tangentially into the cylinder whereby the amount of exhaust gas remaining in the cylinder can be influenced. (The bores 11a of the row 11 of inlets extend radially and the bores 12a of the row 12 of inlets extend tangentially with respect to the cylinder 2.)

It is noted that, in each flow plane 13, 14, there may also be two or several rows 11 or 12 of inlets arranged, in the direction of the cylinder axis 10, on top of one another.

In principle, the radial and tangential bores 11a or 12a may be arranged in any way. But, with respect to retaining the least possible amount of exhaust gas in the cylinder, it is advantageous if the passages 5' of the lower row 11 of inlets are radial and the passages 5 of the upper row 12 of inlets are tangential with respect to the cylinder 2 since the opening periods for the upper row 12 of inlets is longer than that for the lower row 11 of inlets. Consequently the fresh air charge entering through the upper row 12 of inlets receives a greater amount of base spin.

As shown in FIGS. 1 and 3, in its bottom dead center position, the top edge of the piston 3 is slightly above the bottom end of the lower row 11 of scavenging passages 5 so as to provide cooling for the hot rim 15 of the piston 3 adjacent its upper edge 16. In FIGS. 1 and 3 the piston is shown in its bottom dead center position. The bottom dead center position with respect to the inlet rows 11, 12 is schematically indicated also in FIG. 8.

Figure 2:
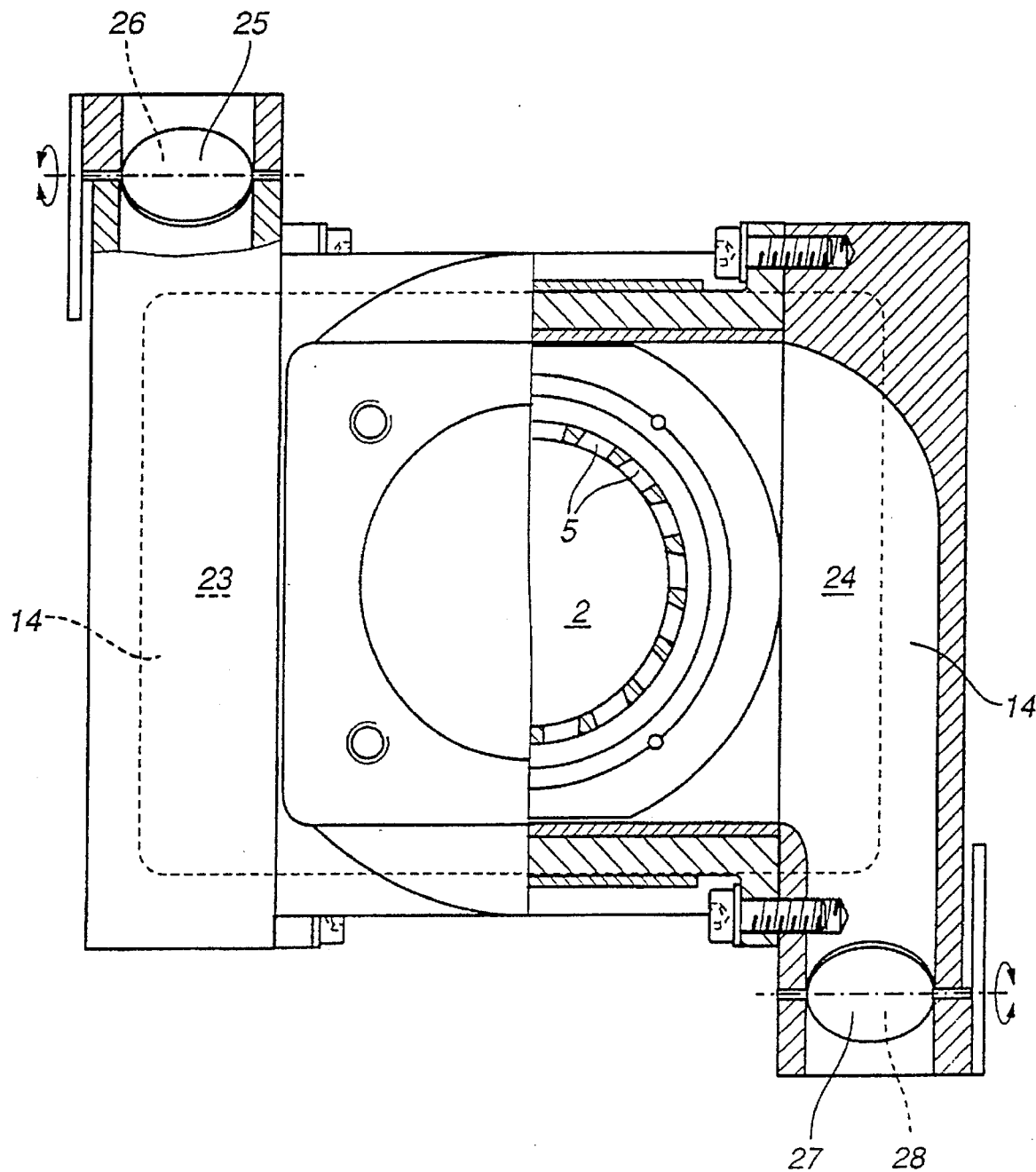
FIG. 2 is a cross-sectional view taken along line II—II of FIG. 1.

As shown in FIGS. 1 and 2, the two separate flow planes 13 and 14, which are arranged, in the direction of the cylinder axis 10, on top of, and adjacent to, one another, are divided into two diametrically opposite flow admission units 23 and 24. The flow admission unit 23 comprises one half of the separate flow planes 13 and 14 and the other flow admission unit 24 comprises the other half of the flow planes 13 and 14. Accordingly the flow admission unit 23 (according to FIGS. 3 and 4) comprises the left half and the flow admission unit 24 comprises the right half of the flow admission planes 13 and 14.

FIG. 2 is a cross-sectional view of FIG. 1 taken along line II—II showing the two diametrically opposite flow admission units 23 and 24. In FIGS. 1 and 3 the same components are designated by the same reference numerals.

The flow admission units 23 and 24 each have two control components (throttle valves) 25, 26 (flow admission unit 23) and 27, 28 (flow admission unit 24). The flow volume in each half of the flow planes 13, 14 of the flow admission unit 23 is controllable by a particular control component (throttle valve) 25 and 26, respectively. In the same way, the flow volume in each half of the flow planes 13, 14 of the admission unit 24 is controllable by a particular control component (throttle valve) 27 and 28 respectively. The control components 25–28 are operated in dependence on the engine operating conditions, for example, via an engine performance graph, and each of the control components 25–28 is controllable independently of the others. In this manner the admission of scavenging air to the inlet rows 11, 12 of each flow plane 13, 14 for each flow admission unit 23 and 24 can be separately controlled.

Fresh air is first admitted to the flow admission units 23, 24 only through one flow channel in each unit. Up-stream of the control components 25, 26 in the flow admission unit 23 and upstream of the control components 27, 28 in the flow admission unit 24, there is a nozzle structure which is not shown in the drawings but which divides the air flow channel of the flow admission units 23 and 24 each into two parts. The nozzle structure acts as a flow divider so that downstream of the nozzle structure and particularly downstream of the control components 25 and 26 and, respectively, 27 and 28, the fresh air flow is separated up to the inlet rows 11 and 12.

As indicated in FIG. 3 and shown particularly in FIGS. 4 to 7, means 6, 6' are arranged around the cylinder 2 adjacent the radial and/or tangential scavenging passages 5, 5' by which the spin imparted to the fresh air can be influenced and by which the air admission flow volume can be controlled by varying the admission flow cross-section 7, 7'. The scavenging passages 5, 5' may be evenly distributed over the circumference of the cylinder. However, in a preferred embodiment they are arranged only on a section of circumference whereas the remaining section of the circumference has no scavenging passages. This latter arrangement is particularly suitable for in-line engines since the distance between cylinders can then be kept as small as possible.

Figure 4:
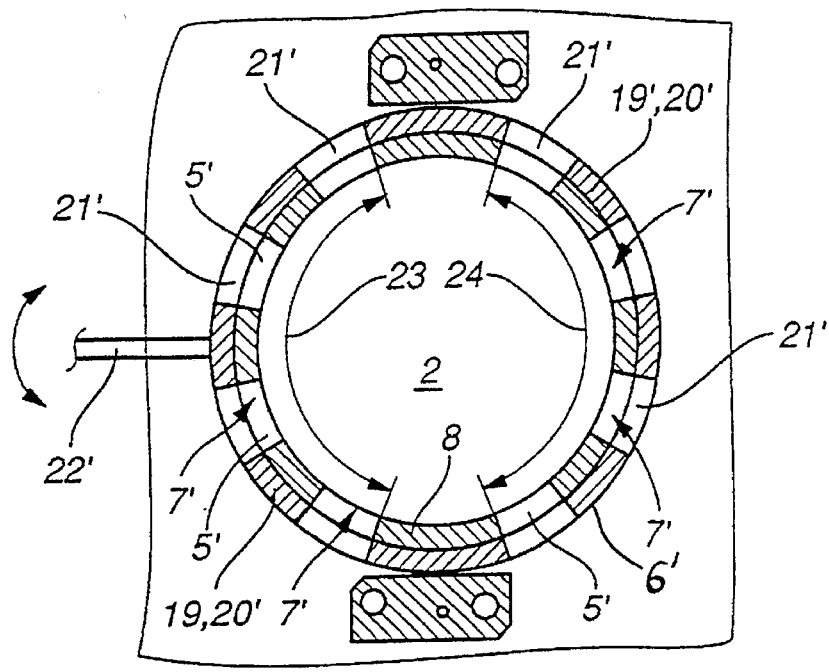
FIG. 4 is a cross-sectional view taken along line IV—IV of FIG. 3 showing a rotatable ring with openings distributed over its circumference for controlling the scavenging air flow cross-section which ring is arranged concentrically around the cylinder adjacent the scavenging air openings of a first row of inlets.

FIG. 4 is a view of a cross-section taken along line IV—IV of FIG. 3. Here, the means 6' for controlling the admission flow cross-section 7' of the flow passages 5' is a rotatable ring 19' which is concentric with the cylinder 2 and extends around the first row 11 of inlets in the first flow plane 13 and which has a ring wall 20' with openings 21' distributed over its circumference. In the embodiment as shown the openings 21' are bores but they may as well have the form of slots or they may be elongated. Identical components are indicated by the same reference numerals as in FIG. 1. By suitably shaping the openings 21 the spin imparted to the in-flowing fresh air can be influenced, for example, by providing openings 21' in the ring 19' with walls which extend at an angle with respect to the respective scavenging air passages 5'

Figure 5:
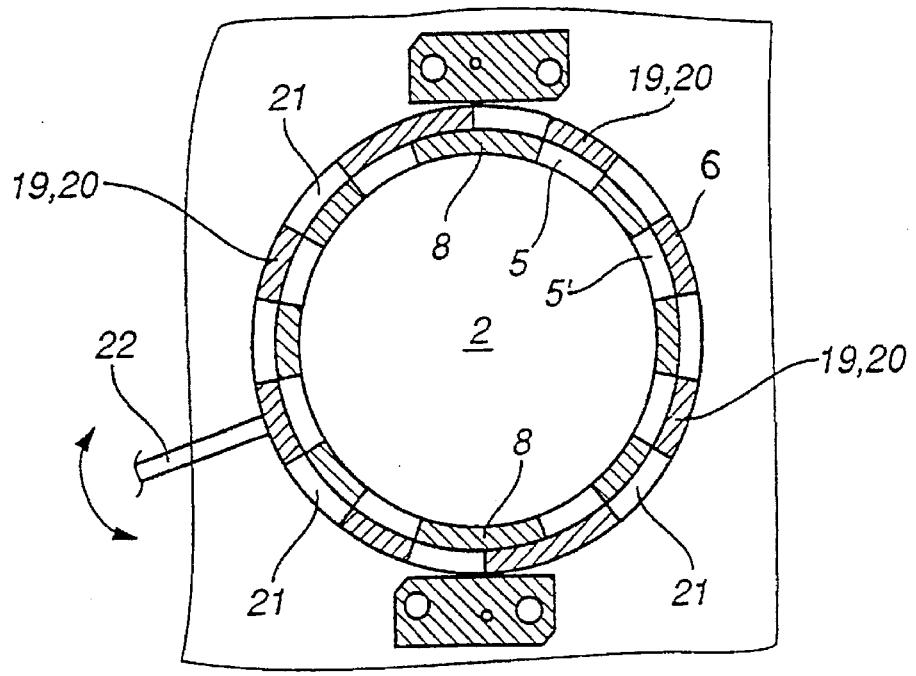
FIG. 5 is a cross-sectional view taken along line V—V of FIG. 3 showing a second cylinder-concentric rotatable ring for the second row of inlets, that is, air admission plane, in a position in which the scavenging air inlets are fully closed.

The openings 21' of the ring 19' are so arranged that, in a first position of the ring 19' they are congruent with the scavenging passages 5' so that the admission flow cross-section 7' is fully open (see FIG. 4) and, in a second position of the ring 19', the ring wall 20' extends over the scavenging passages 5' to fully close the admission flow cross-section 7' (as shown in FIG. 5). The admission flow cross-section 7' of the scavenging passages 5' can be controlled with the ring 19' in a stepless fashion between the fully open position and the fully closed position. The ring 9' can be rotated by an operating rod 22' (schematically shown in FIG. 4) which is mounted to the ring wall 20' and which can be moved in the directions as indicated by the arrows.

FIG. 5 is a cross-sectional view taken along line V—V of FIG. 3. Here, the means 6 for affecting the spin and controlling the flow cross-section 7 of the scavenging air passages 5 is a second rotatable ring 19 which is concentric with the cylinder 2 and extends around the second row 12 of inlets in the second flow plane 14 and which has a ring wall 20 with openings 21 distributed over its circumference. The rotatable ring 19 is shown in a position in which the scavenging air passages 5 of the second row 12 of inlets are fully closed. The ring 19 of FIG. 5 is of the same design as ring 19' of FIG. 4. The same components of FIG. 1 are provided with the same reference numerals as in FIG. 5.

Figure 6:
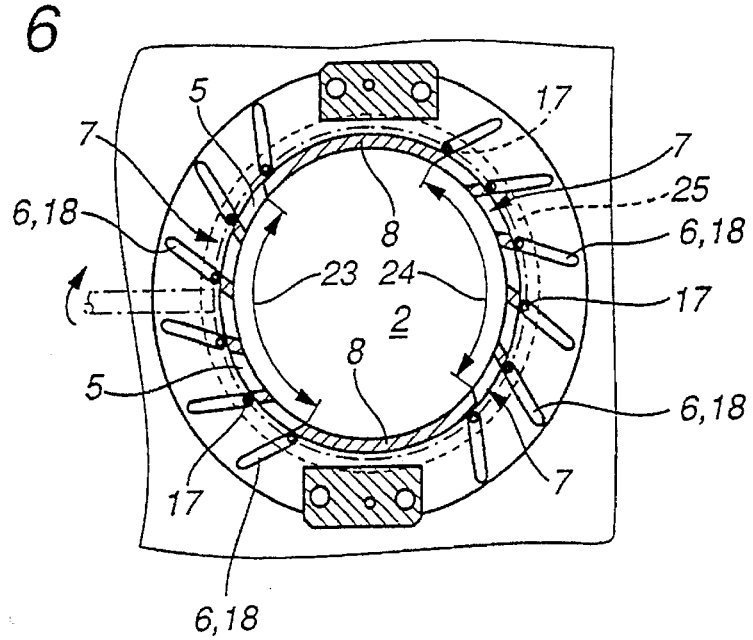
FIG. 6 shows another embodiment of the invention wherein guide vanes are provided for influencing the spin of the air and for controlling the flow volume of the fresh air admitted wherein the guide vanes are shown in an open position.
Figure 7:
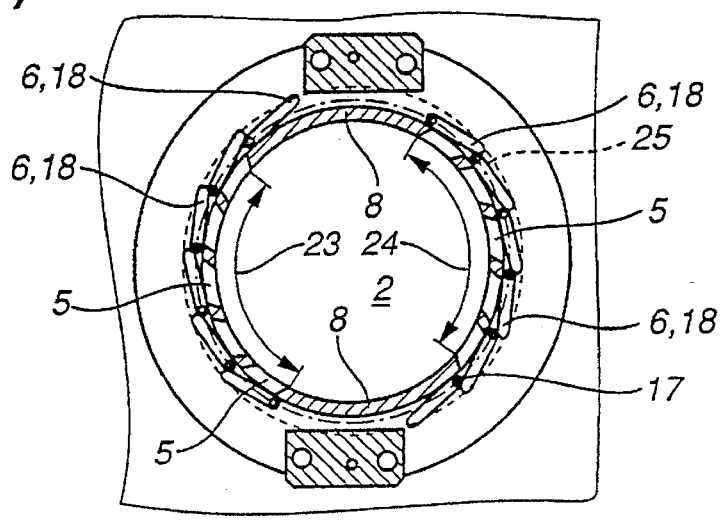
FIG. 7 shows an arrangement like that of FIG. 6 but with the guide vanes in a closed position (blocking the air)

In accordance with FIGS. 6 and 7 the means 6 for affecting spin and controlling the admission flow cross-section 7 are guide vanes 18 which are pivotable about an axis 17 and are disposed adjacent respective scavenging passages 5. The guide vanes 18 are pivotable in such a manner that the admission flow cross-section 7 of the scavenging passages 5 can be controlled in a stepless fashion and can be fully blocked, disregarding some leakage flow. FIGS. 6 and 7 only show a cross-section through one of the flow planes 13 and 14. In FIGS. 6 and 7 the same reference numerals are used for the same components as in FIG. 3. The guide vanes 18 are pivotable by means of a control ring 30 which is concentric with the cylinder 2 and rotatably supported as well known in principle. The ring 30 is shown by dashed lines. Each guide vane 18 is provided with an operating pin (not shown) which is engaged by a receiver arranged at the circumference of the control ring 30. Upon rotation of the control ring 30, the operating pins of the guide vanes 18 are carried along whereby the guide vanes 18 are pivoted about their pivot axes 17.

In one embodiment of the invention the means for affecting the spin of the fresh air entering through the scavenging passages may be stationary or pivotable guide vanes which have such a profile and/or pivot position that spin is imparted to the fresh air flowing there-past in a particularly effective manner.

In a preferred embodiment of the invention the guide vanes 18 in the row 12 of inlets are those as described with reference to FIGS. 6 and 7 (they serve mainly to impart the desired spin to the fresh air admitted) whereas, in the lower row 11 of inlets, a ring 19' as shown in FIG. 4 is provided (it serves mainly to control the flow volume of the admitted fresh air). With this arrangement, a greater spin can be applied to the air entering through the upper row 12 of inlets which, because of the engine operating principle, are also open for a longer period of time as already mentioned earlier.

Figure 8:
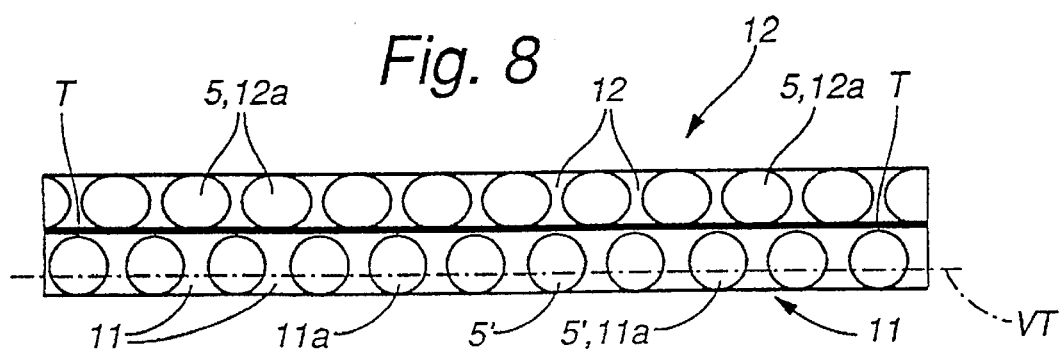
FIG. 8 shows the development of the second row of inlet openings as shown in FIG. 1.

FIG. 8 shows part of the development of the two rows 11, 12 of inlets of FIG. 1 wherein the position of the upper edge of the piston 3 with the piston in the bottom dead center position is indicated by the dash-dotted line VT. The scavenging passages 5, 5' of each inlet row 11, 12 are bores 11a, 12a which are evenly distributed over the circumference of the cylinder 2 and wherein the bores 11a of the lower inlet row 11 extend radially and the bores 12a of the upper inlet row 12 extend tangentially with respect to the cylinder 2.

It is of course also possible that the scavenging air flow passages of the inlet rows have different shapes such that the scavenging air is admitted to the cylinder in the lower inlet row in a tangential direction and in the upper inlet row in a radial direction or that the air flow passages have the same geometry in both inlet rows.

In the embodiments presented herewith the inlet system is shown with two flow planes. However, it is just as well possible to use only one flow plane so that, for influencing the spin and for controlling the volume flow of fresh air, there is also only one level of means for affecting the spin, be it a rotatable ring or a flow guide structure. Also the invention can be utilized in connection with two cycle internal combustion engines with or without separate scavenging air pumps.

What is claimed is:

1. An inlet system for a two-cycle internal combustion engine comprising: a cylinder, a piston disposed in said cylinder for reciprocating therein between a top dead center position and a bottom dead center position, at least two rows of scavenging air passages arranged in separate air flow planes formed around the circumference of said cylinder adjacent said bottom dead center position thereof, said scavenging air flow passages being closed by said piston when said piston is remote from said bottom dead center position, each of said separate flow planes having independent air flow control components for controlling the admission of scavenging air to said at least two rows of scavenging air passages, said control components being adjustable depending on engine operating parameters.

2. An inlet system according to claim 1, wherein said scavenging air passages of said two rows are arranged with one on top of, and adjacent to, another and the scavenging air passages in one of said two rows are arranged such that scavenging air is admitted to the cylinder in a radial direction and those in the other row are arranged such that scavenging air is admitted to said cylinder in a tangential direction.

3. An inlet system according to claim 2, wherein said scavenging air passages of each row are bores arranged circumferentially around said cylinder and the bores of the upper row of passages extend tangentially and the bores of the lower row of passages extend radially with respect to said cylinder.

4. An inlet system according to claim 1, wherein at least some of said scavenging air passages include means for influencing the spin imparted to the air passing through the respective passages and for controlling the scavenging air flow cross-section of the respective passages.

5. An inlet system according to claim 4, wherein said means for controlling the scavenging air flow cross-section are flow vanes pivotally supported in such a way that the flow cross-section of said scavenging air passages can be steplessly controlled and, except for leakage flows, can be fully blocked.

6. An inlet system according to claim 4, wherein said means for controlling the scavenging air flow cross-section is a rotatable ring concentrically disposed around said cylinder adjacent said scavenging air flow passages, said ring having a wall with openings spaced around its circumference.

7. An inlet system according to claim 6, wherein the openings in said ring wall are so arranged that, in a first position of said ring, its openings are congruent with the scavenging air passages in said cylinder to permit unrestricted scavenging air flow therethrough and, in a second position of said ring, the wall of said ring covers said scavenging air passages so as to completely block said passages, said ring being steplessly movable between said first and said second positions thereof.

8. An inlet system according to claim 2, wherein said scavenging air passages in said lower row are open downwardly beyond the top edge of said piston in its bottom dead center position thereby to provide cooling for the top edge of said piston.

9. An inlet system according to claim 1, wherein said inlet system includes two flow admission units for supplying fresh air to said cylinder, said two admission units being flow-separated from one another and each comprising one half of said flow planes and wherein for each half of said flow planes in the respective flow admission units there are provided separate control components for controlling the admission of fresh air thereto.

* * * * *